United States Patent [19]
Noguchi et al.

[11] Patent Number: 5,469,189
[45] Date of Patent: Nov. 21, 1995

[54] DISPLAY APPARATUS AND METHOD WITH MULTI-WINDOW FUNCTION

[75] Inventors: Yasuhiro Noguchi; Hiroshi Kuwahara; Isao Yasuda, all of Hitachi; Kazuo Takei, Ibaraki, all of Japan

[73] Assignee: Hitachi, Ltd., Tokyo, Japan

[21] Appl. No.: 346,791

[22] Filed: May 3, 1989

[30] Foreign Application Priority Data

May 6, 1988 [JP] Japan ................................. 63-109046

[51] Int. Cl.⁶ .................................................. G09G 1/06
[52] U.S. Cl. ........................... 345/118; 345/133; 395/157
[58] Field of Search ...................... 340/734, 721, 340/712, 724, 747, 723; 364/521; 358/183, 182; 345/118, 112, 119, 120, 115, 133, 173, 146; 395/156, 157; 348/589

[56] References Cited

U.S. PATENT DOCUMENTS

| | | | |
|---|---|---|---|
| 4,727,418 | 2/1988 | Kato et al. | 358/183 |
| 4,931,957 | 6/1990 | Takagi et al. | 340/747 |

FOREIGN PATENT DOCUMENTS

| | | | |
|---|---|---|---|
| 1218749 | 3/1987 | Canada | 354/229 |
| 48712 | 12/1987 | European Pat. Off. | 340/721 |

OTHER PUBLICATIONS

"Inside Macinotosh" vol. I Apple Computer, Inc., 1985.

*Primary Examiner*—Tommy P. Chin
*Assistant Examiner*—Doon Chow
*Attorney, Agent, or Firm*—Antonelli, Terry, Stout & Kraus

[57] ABSTRACT

A display apparatus automatically rounds corners of a rectangular area frame for display thereof, the rectangular area frame including that of a window or that of a graph and the like displayed within the window. The rounding is effected by automatically calculating and displaying circular arcs (ellipstic arcs) of corners based on the inputted corner coordinates of the rectangular area frame, or by not displaying one or several dots of each corner. In the case where multi-windows are displayed in an overlap manner or a plurality of rectangular area frames are displayed within a window, the corners are not displayed stiffly and emphasized unnecessarily, thus providing a visually soft and natural display image, improving the quality of displayed images, and providing an improved handy method for use by an operator. In a document editing apparatus, the corners of a rectangular frame of a window or of a rectangular area for display of graphs or the like in the window are visually recognized as being round, whereas the corners of a hard copy are formed with original right angles.

4 Claims, 12 Drawing Sheets

DISPLAY APPARATUS AND METHOD WITH MULTI-WINDOW FUNCTION

BACKGROUND OF THE INVENTION

The present invention relates to a display apparatus (also called a work station) used in office automation systems and automatic design support systems (apparatus), and more particularly to a display apparatus having a multi-window and multi-view-port function. A multi-window and multi-view-port function (hereinafter abbreviated as a multi-window function) is a function to allow desired document (inclusive of graph) editing and the like by designating a command on a window or view-port while a plurality of application programs share a single display screen.

Conventional apparatus in the related art are known as disclosed, e.g., in Japanese Patent Laid-open Publications JP-A-60-205492 and JP-A-57-125989. Disclosed in the Publications is a method of discriminating among a plurality of displayed windows.

The publication JP-A-60-205492 teaches that an operator can distinguish between a current window and non-current window by using a different brightness therebetween, the current window being operated upon while the non-current window is not operated upon. The Publication JP-A-57-125989 teaches that windows can be discriminated by displaying one window superposed on another on black background. None of the Publications takes into consideration the configuration of window at all, and suggests any problems associated with the configuration.

The above-described prior art does not take into consideration the configuration of window. Therefore, if a plurality of rectangular windows are displayed in an overlapped manner, the right angle corners of the windows are disposed near to each other. Therefore, operators pay attention to the corners which are displayed in a stiff manner and emphasized unnecessarily.

SUMMARY OF THE INVENTION

It is an object of the present invention to provide a display apparatus capable of changing the displayed configuration of corners of a window on a display screen, and giving an operator a spot and natural window display.

It is another object of the present invention to provide a display apparatus capable of automatically processing right-angled corners of a rectangle in order not to unnecessarily call an operator's attantion to them, during not only a window display but also a rectangle display, a rectangle being a frame surrounding a document editing area within a window, a sentence area, figure area, graph area or the like within the document editing area.

It is a further object of the present invention to provide a document editing apparatus capable of displaying Such processed corner portions of a window and of a rectangular area frame after processing the corners, while outputting a hard copy with the original right-angled corners not subjected to processing.

The present invention is characterized in that the angular corners of a window or of a rectangular area frame surrounding a graph or the like are displayed while rounding them. The term "rounding" includes not only displaying such a corner by using a curve, but also not displaying one or several dots constituting an intersecting point at the corner of a window or a rectangular area frame.

According to the present invention, the corners of a window or of a rectangular area frame surrounding a graph or the like are automatically rounded and displayed, thus improving the quality of displayed images and providing an improved convenient apparatus for use by an operator.

According to the present invention, the corners of a window or of a rectangular area frame surrounding a graph or the like, which have been rounded and displayed, are outputted in a hard copy as the original rectangular corners.

The above and other objects of the present invention will become apparent from the following description.

DESCRIPTION OF THE PREFERRED EMBODIMENTS

Figure 1:
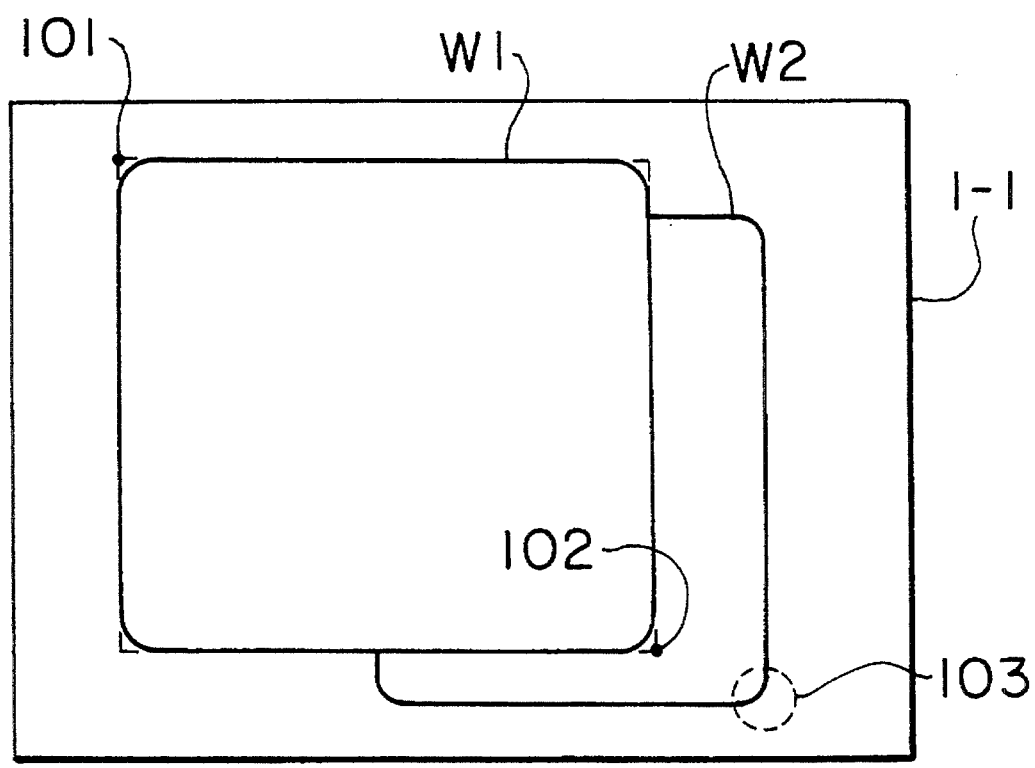
FIG. 1 shows a first example of displayed windows.

FIG. 1 shows an example of displayed windows according to the present invention. A multi-window of two overlapped windows W1 and W2 are displayed on a display screen 1-1. Conventionally, a window having right angle corners has been displayed by inputting two coordinates at points 101 and 102 while moving a cursor with a mouse. According to the present invention, all the corners 103 of a displayed window are rounded. As will be described later, the term "rounding" also means that a particular pixel or pixels at corners are not displayed.

According to the present invention, upon input of the coordinates at two diagonal points 101 and 102 of a window, the window having automatically rounded the corners is displayed as shown in FIG. 1.

Figure 2:
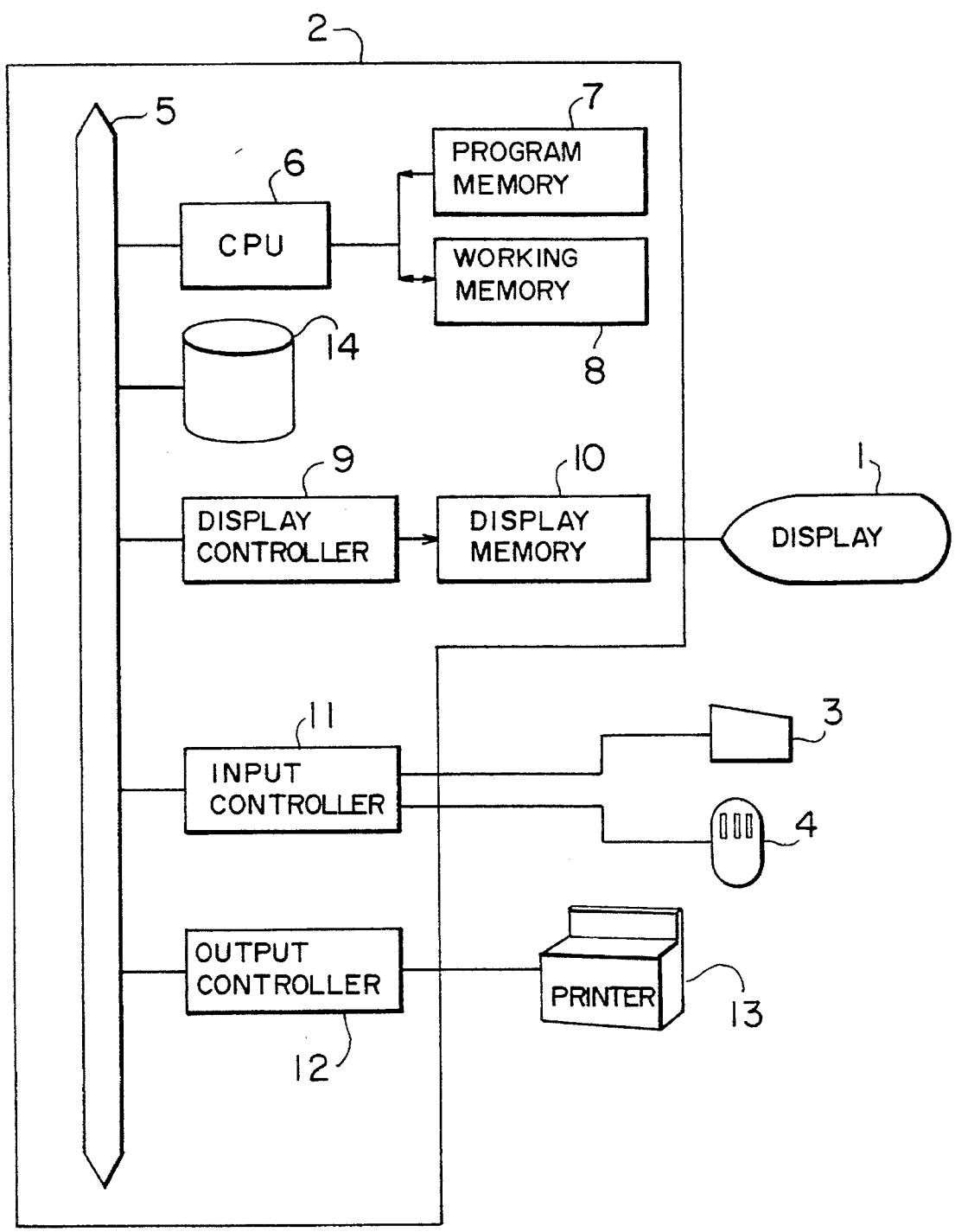
FIG. 2 shows an embodiment of the system arrangement of a document editing apparatus according to the present invention.

FIG. 2 shows an example of the system arrangement of a document editing apparatus according to an embodiment of the present invention. A keyboard 3 and mouse 4 serving as an input device for inputting a document element such as characters and graphs are connected to an input controller 11 within a main frame 2. The input controller 11 is connected to a system bus 5 to which also connected are CPU 6, display controller 9 and output controller 12. The display controller 9 is connected to a display memory 10 which is connected to a display unit 1 for displaying an input and edited document. Connected to CPU 6 are a program memory 7 and a working memory 8. The program memory 7 stores therein programs for a series of processes such as a temporary storage process for inputted document elements, an input process, a display process, an edit process, and a storage process. A printer 13 serving as an output device is connected to the output controller 12. A document file 14 is an external memory for storing edited documents.

Figure 3:
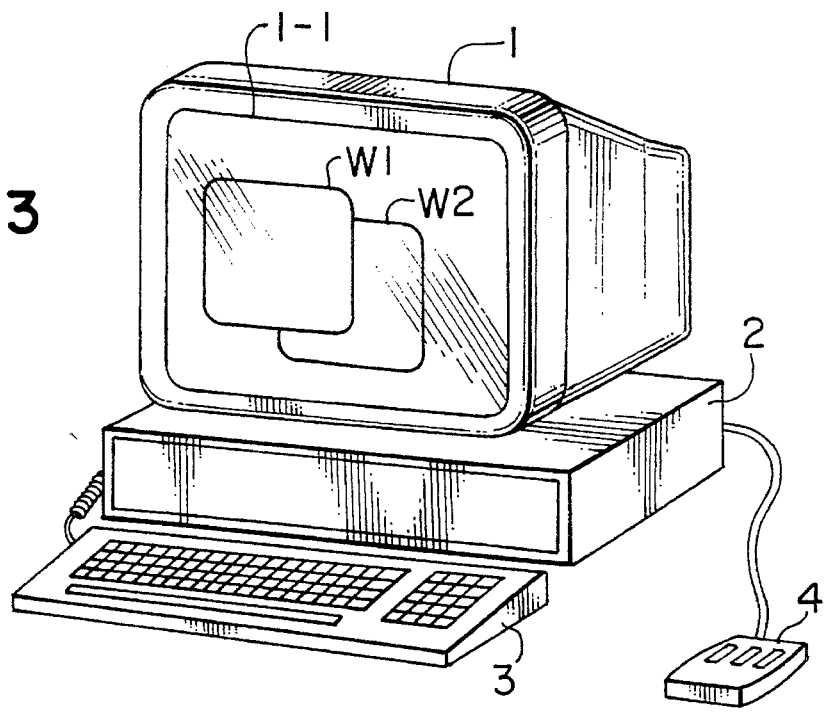
FIG. 3 shows an example of a perspective view of the appatatus according to the present invention.

FIG. 3 shows an example of the perspective view of the apparatus embodying the present invention, wherein printer 13 is not shown.

Figure 4:
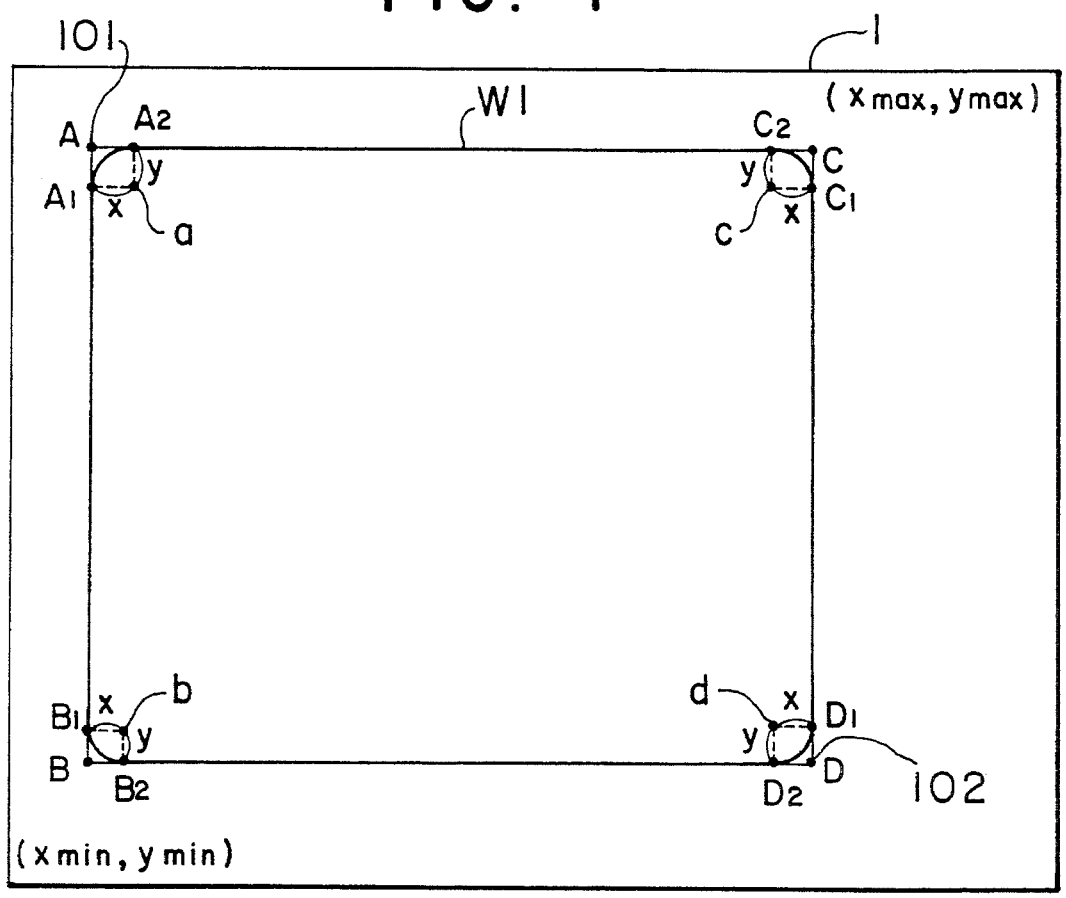
FIG. 4 shows a window on the display screen as used for explaining the embodiment method of this invention.

Consider now the case where the window W1 is displayed on the display screen 1-1 of the display unit 1 as shown in FIG. 1. FIG. 4 shows a window on the display screen as used for explaining the embodied method of this invention. A rectangle whose coordinates of two diagonal input points are indicated at 101 and 102 is generally represented by A-B-C-D. The coordinate at the lower left corner B of the rectangular is represented by $(x_{min}, Y_{min})$, and that at the upper right corner C by $(x_{max}, Y_{max})$. The start points of rounding at respective corners are represented by A1, B1, C1 and D1, and the end points thereof by A2, B2, C2 and D2. The centers of rounding are represented by a, b, c and d. The width between the center and the rounding start point is represented by x, and that between the center and the rounding end point is represented by y.

Figure 5:
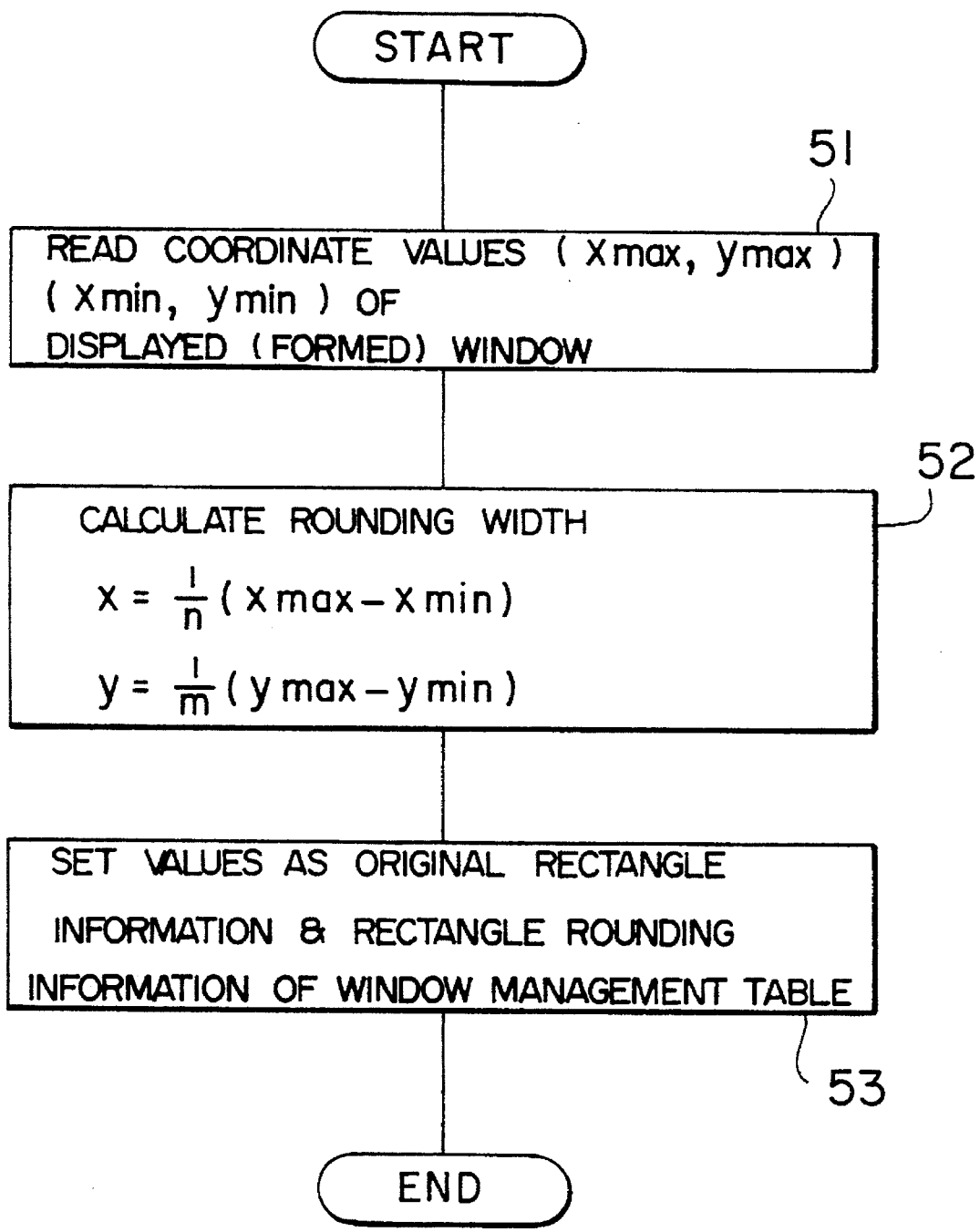
FIG. 5 is a flow chart illustrating a program of a window input process routine in accordance with the present invention.
Figure 6:
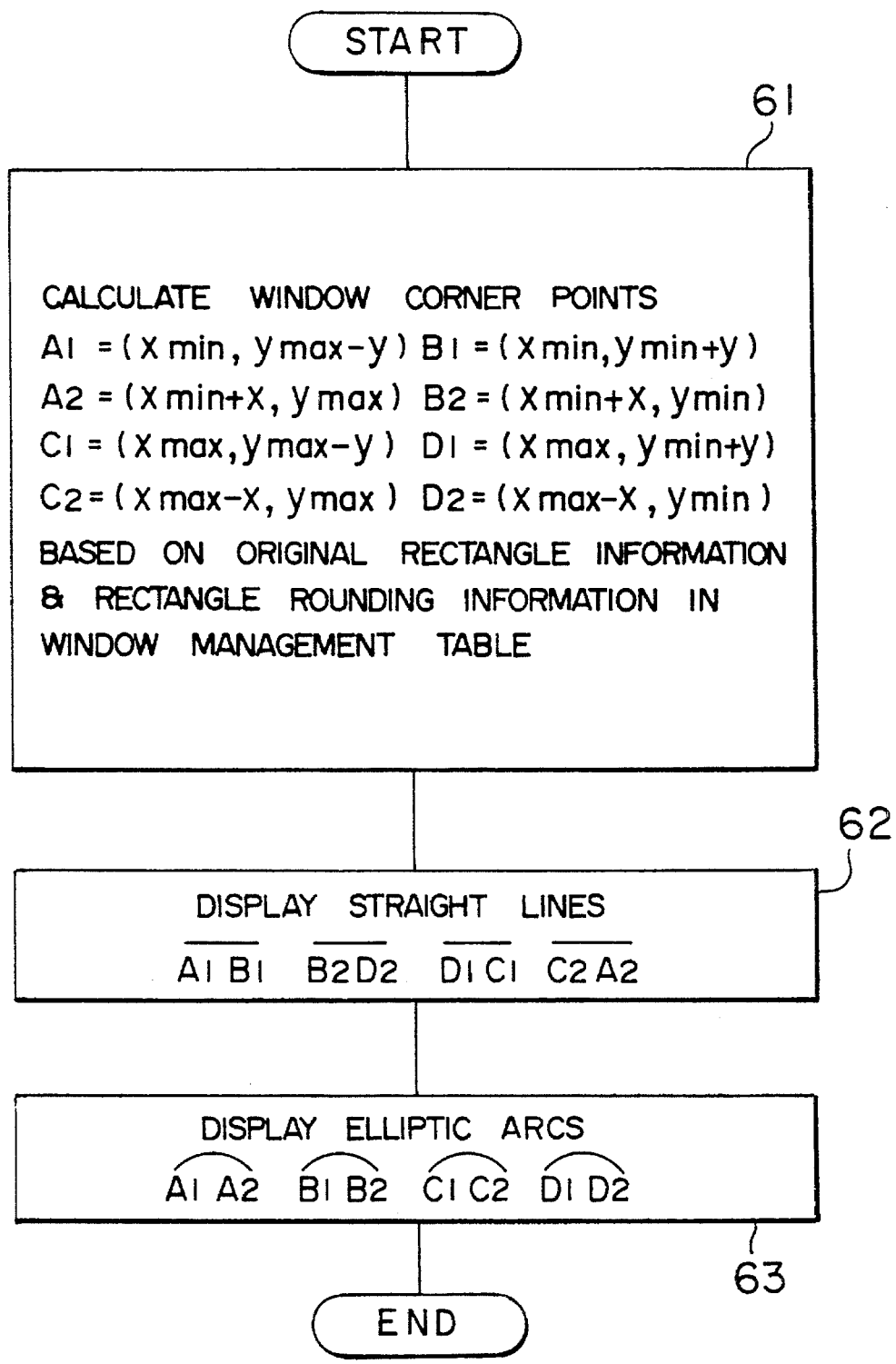
FIG. 6 is a flow chart illustrating a program of a window display process routine in accordance with the present invention.
Figure 7:
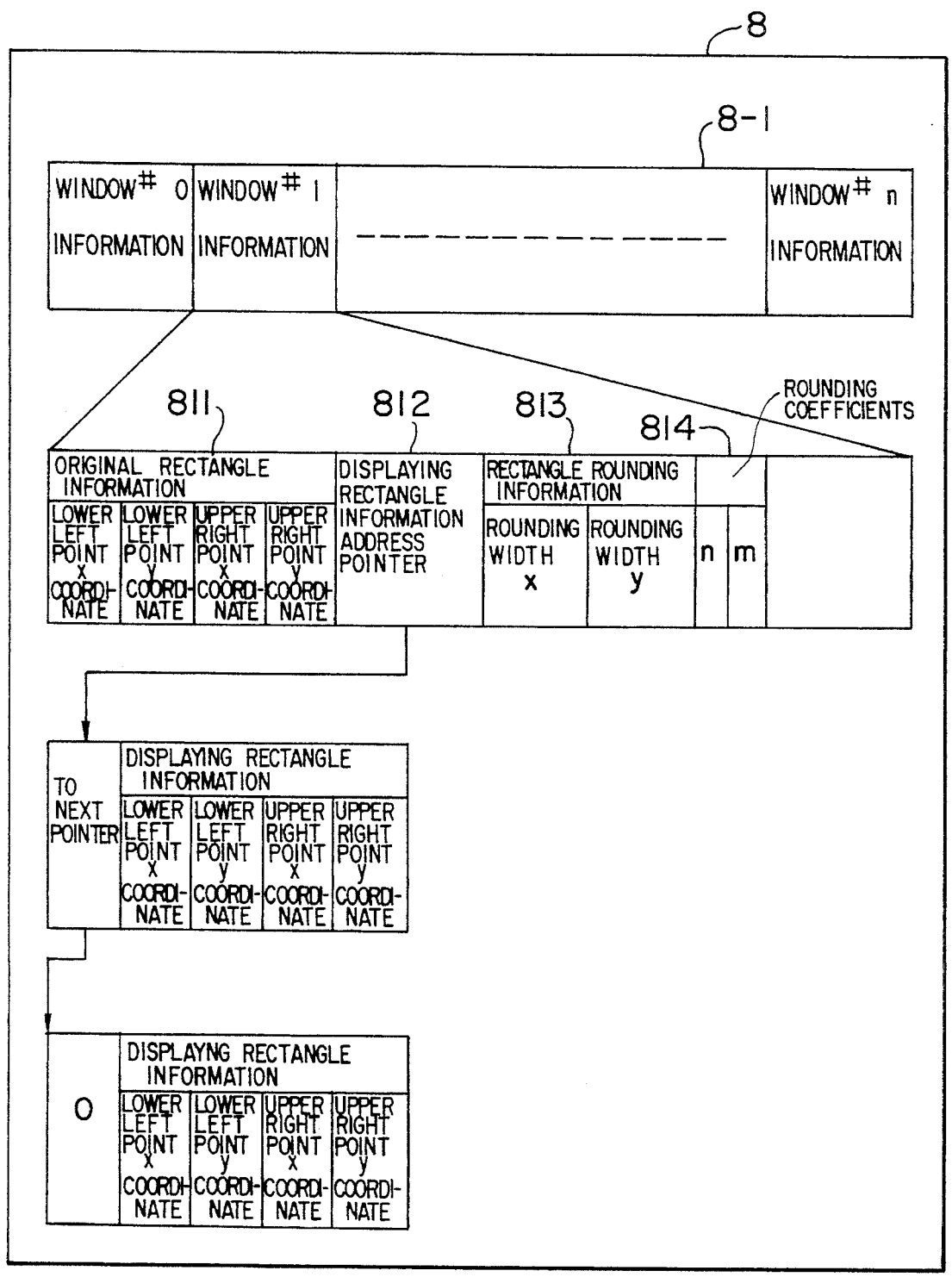
FIG. 7 shows an example of a window management table in a working memory for storing information necessary for performing the processes shown in FIGS. 5 and 6.

FIGS. 5 and 6 are flow charts of the programs for window input and display processes stored in the program memory 7. FIG. 7 shows a window management table in the working memory 8 for storing window information necessary for executing the processes shown in FIGS. 5 and 6.

An operator inputs the two diagonal points 101 and 102 of the window with the input device of mouse 4 or keyboard 3. Inputted data are sent via the input controller 11 and system bus 5 to CPU 6. CPU 8 determines based on the inputted data the lower left corner coordinate and upper right corner coordinate of the window which are stored as original rectangle information 811 in the window management table 81 of the working memory 8 (window input process 51 in FIG. 5). Next, based on the original rectangle information and rounding coefficients n and m previously set as window information, CPU 6 calculates rounding widths x and y (process 52 in FIG. 5):

$$x = (x_{max} - x_{min}) \times (1/n)$$

$$y = (y_{max} - y_{min}) \times (1/m)$$

The values of the rounding widths are stored as rectangle rounding information 813 in the window management table 81 (process 53 in FIG. 5).

In the window display process, CPU 6 calculates based on the data in the window management table the rounding start and end points for the respective corners of the window (window display process 61 in FIG. 6):

$$A_1 = (x_{min}, y_{max} - y)$$

$$A_2 = (x_{min} + x, y_{max})$$

$$B_1 = (x_{min}, y_{min} + y)$$

$$B_2 = (x_{min} + x, y_{min})$$

$$C_1 = (x_{max}, y_{max} - y)$$

$$C_2 = (x_{max} - x, y_{max})$$

$$D_1 = (x_{max}, y_{min} + y)$$

$$D_2 = (x_{max} - x, y_{min})$$

Next, in accordance with the calculated points, straight line segments $\overline{A_1B_1}$, $\overline{B_2D_2}$, $\overline{D_1C_1}$, $\overline{C_2A_2}$ of the window are displayed (process 62 in FIG. 6). Then, elliptic arcs $\widehat{A_1A_2}$, $\widehat{B_1B_2}$, $\widehat{C_1C_2}$, $\widehat{D_1D_2}$ each being one fourth of an ellipse having major and minor axes (x, y) are displayed by using respective centers (process 63 in FIG. 6):

$$a = (x_{min} + x, y_{max} - y)$$

$$b = (x_{min} + x, y_{min} + y)$$

$$c = (x_{max} - x, y_{max} - y)$$

$$d = (x_{max} - x, y_{min} + y)$$

With the above-described processes, the window W1 as shown in FIG. 1 is displayed. Information stored in a display rectangle address pointer in the window management table shown in FIG. 7 is used for the case where another window, e.g., window W2 shown in FIG. 1, is displayed overlapping the window 1. The method of displaying an overlapped window is well known so the detail thereof is not given herein.

If a low-precision hit map display apparatus (e.g., 1280× 1024 dots) is used, a smooth rounding as described with the above embodiment may sometimes become impossible. In such a case, a particular dot or dots are not displayed as shown in FIGS. 8A and 8B and FIGS. 9A and 9B. If a frame line of a window is displayed by using two dot lines, three dots at each corner are not displayed as shown in FIG. 8B. If a frame line of a window is displayed by using one dot line, one or three dots as shown in FIGS. 9B and 9C are not displayed.

Figure 8A:
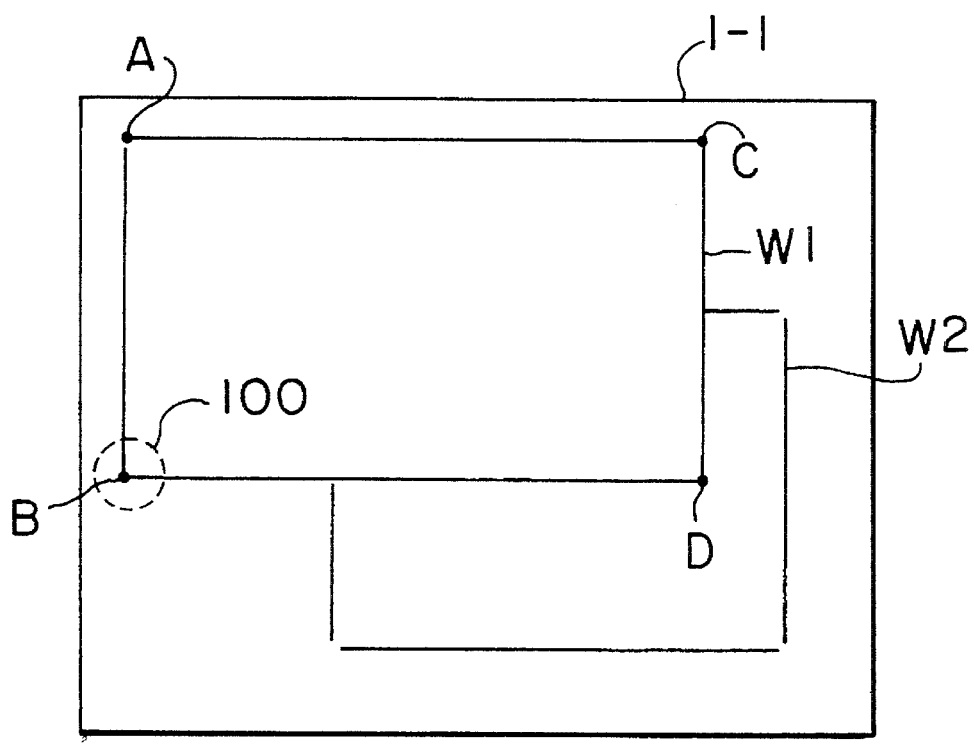
FIGS. 8A and 8B show a second example of displayed windows according to the present invention.
Figure 8B:
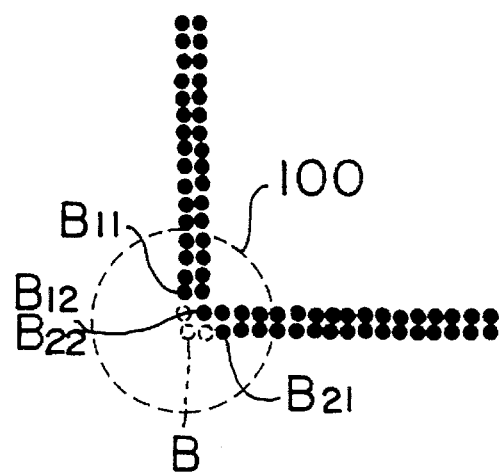
Figure 9A:
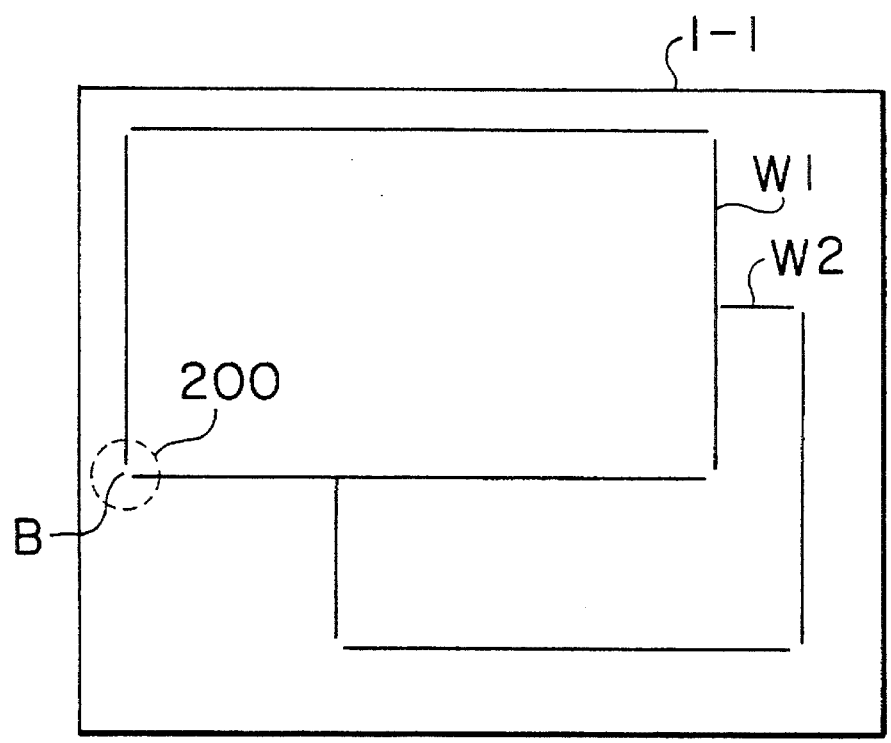
FIGS. 9A to 9C show a third embodiment of displayed windows according to the present invention.
Figure 9B:
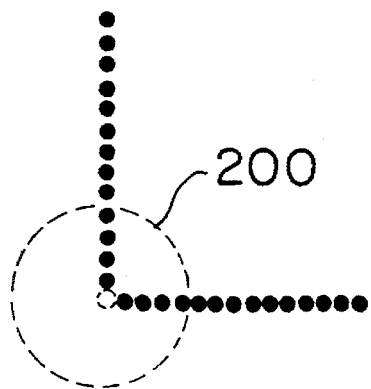
Figure 9C:
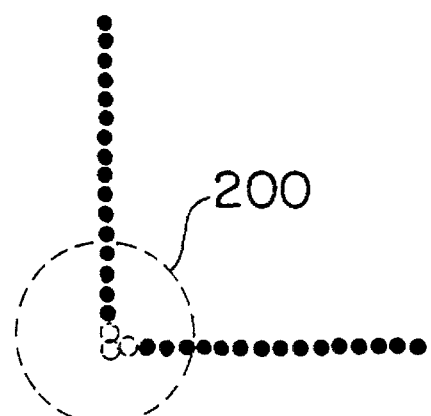

FIG. 8B is an enlarged view of a corner 100 of window W1 shown in FIG. 8A, whereas FIGS. 9B and 9C are enlarged views of corner 200 of window W1 shown in FIG. 9A.

Although an enlarged view for only a corner B is given in FIG. 8B with frame line information of rounding start and end points being indicated at $B_{11}$, $B_{12}$, $B_{22}$, $B_{21}$, the corresponding rounding start and end points at the other corners A, C and D are represented by identical suffixes to those at corner B in the following description.

First, a window frame display method will be described with reference to FIG. 8B wherein the frame line of a window is displayed by using two dot lines.

Figure 10:
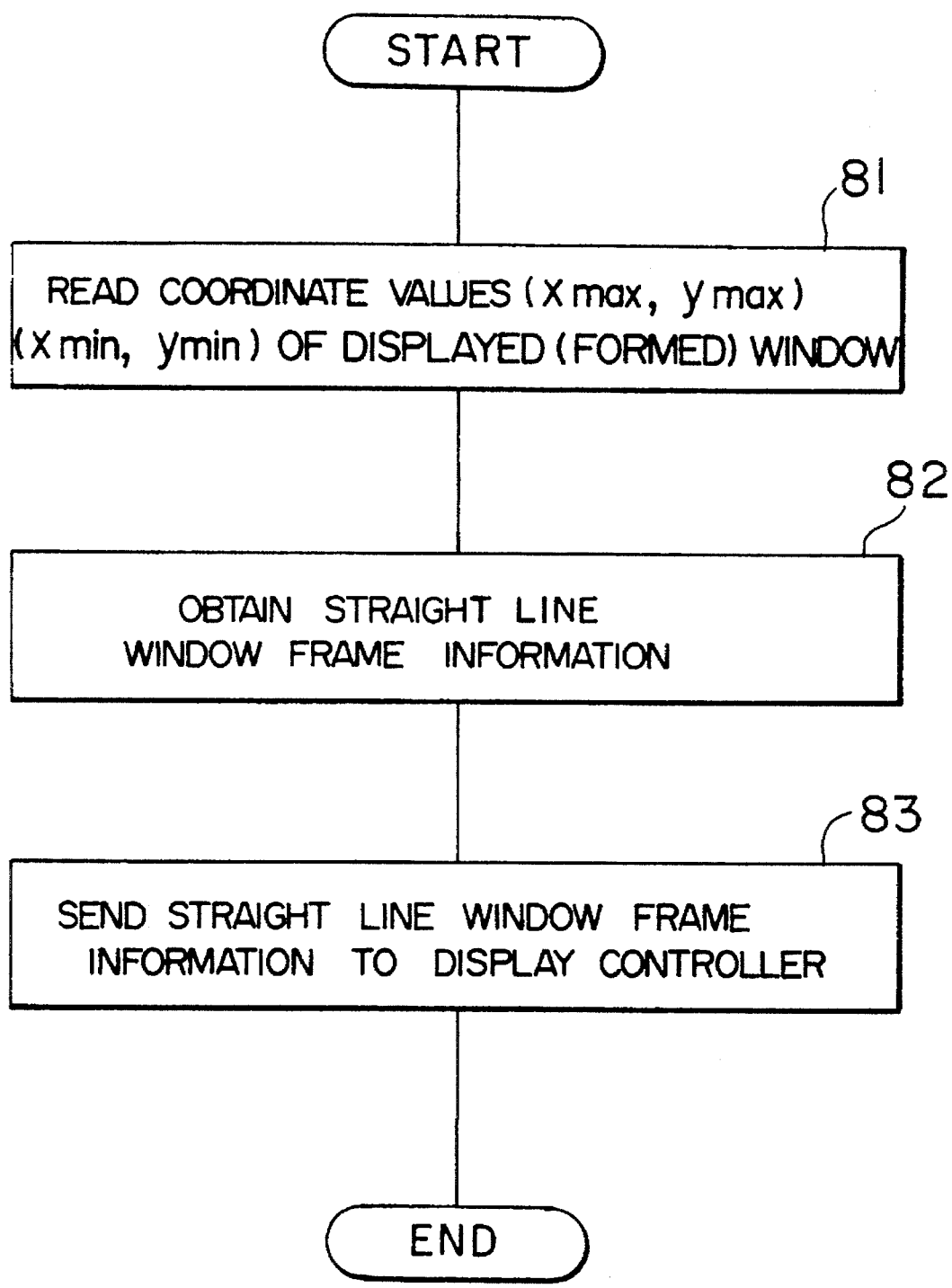
FIG. 10 is a flow chart illustrating an input process for forming the second example window shown in FIG. 8.
Figure 11:
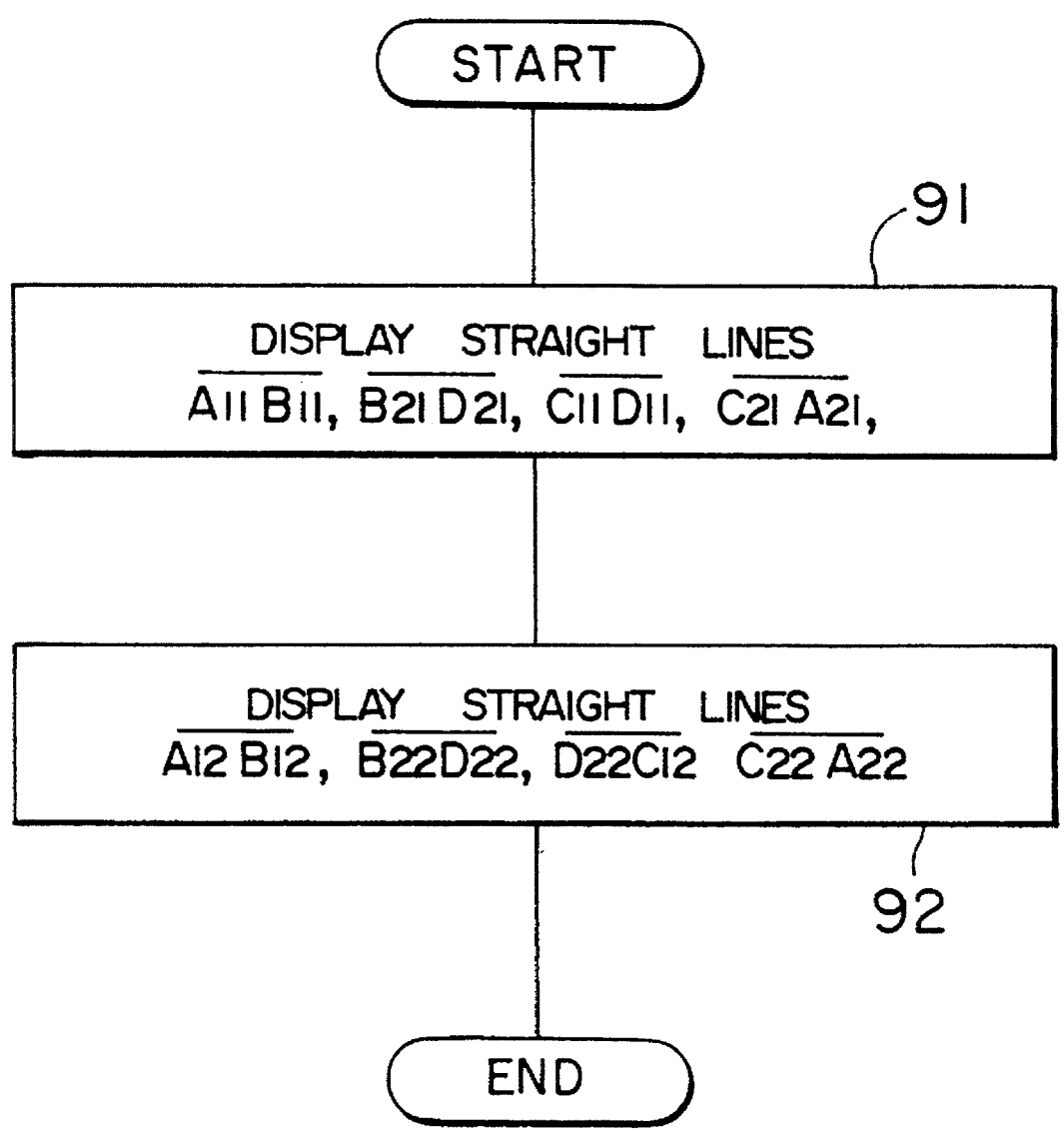
FIG. 11 is a flow chart illustrating a window display process for the second example window shown in FIG. 8.
Figure 12:
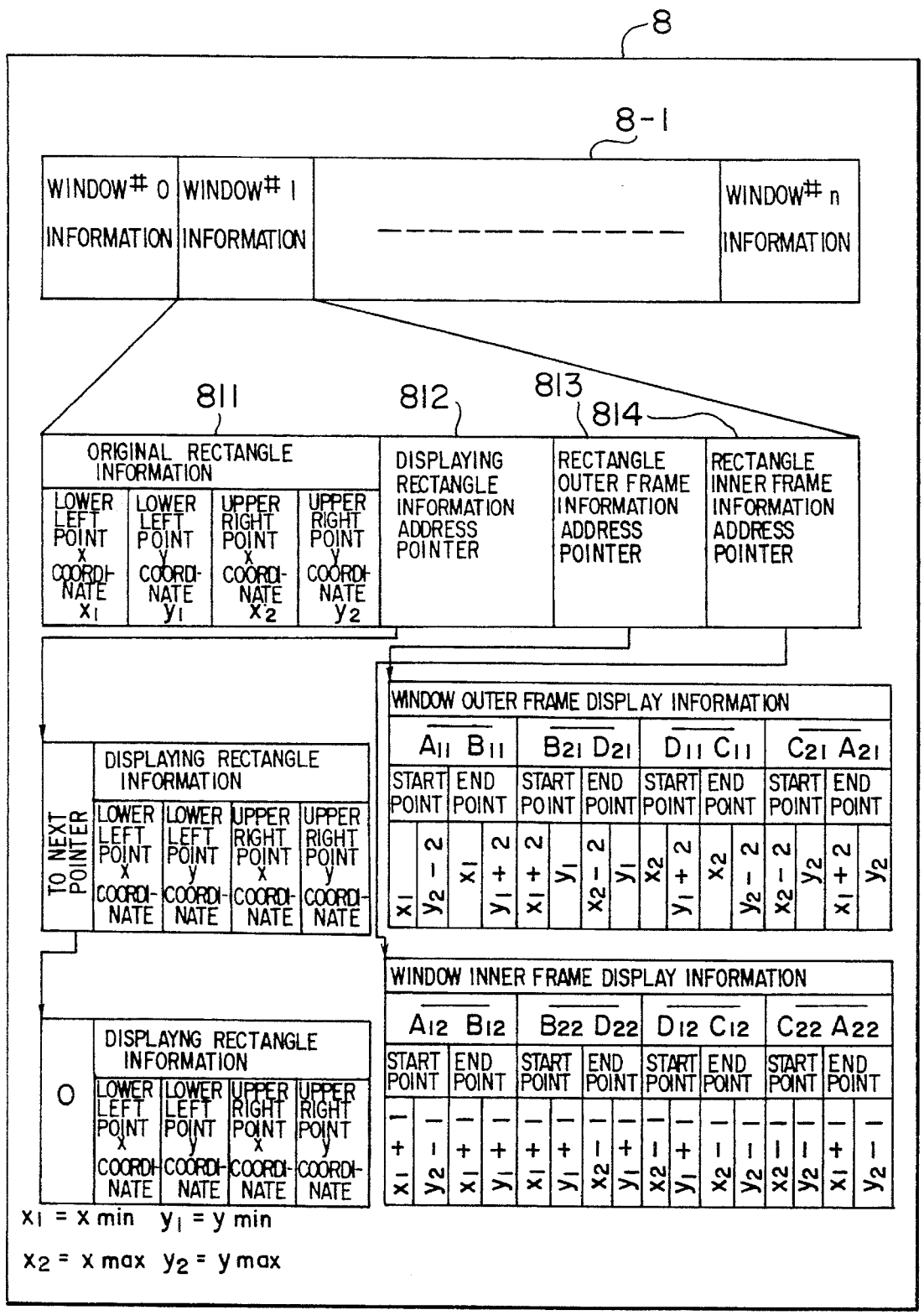
FIG. 12 shows an example of a window management table for the second example window shown in FIG. 8.

In a manner similar to the above-described embodiment, CPU 6 first obtains from the two inputted coordinates the lower left corner coordinate and upper right corner coordinate of a window to be displayed. The obtained lower left and upper right corner coordinates are stored as the original rectangle information 811 in the window management table 81 of the working memory 8 (window input process 81 in FIG. 10). The coordinate and rectangle information are represented in terms of dots (i.e. number of dots) on the display screen. Next, based on the obtained original rectangle information, outer straight line frame information on the window frame composed of two dot lines is obtained. The outer straight line frame information including:

$A_{11}=(x_{min}, y_{max}-2)$ $A_{21}=(x_{min}+2, y_{max})$ $B_{11}=(x_{min}, y_{min}+2)$ $B_{21}=(x+2, y_{min})$ $C_{11}=(x_{min}, y_{max}-2)$ $C_{21}=(x_{max}-2, y_{max})$ $D_{11}=(x_{max}, y_{min}+2)$ $D_{21}=(x_{max}-2, y_{min})$ is stored as window outer frame information in a window management table as shown in FIG. 12. Additionally, inner straight line frame information including:

$A_{12}=(x_{min}+1, y_{max}-1)$ $A_{22}=(x_{min}+1, y_{max}-1)$ $B_{12}=(x_{min}+1, y_{min}+1)$ $B_{22}=(x_{min}+1, y_{min}+1)$ $C_{12}=(x_{max}-1, y_{max}-1)$ $C_{22}=(x_{max}-1, y_{max}-1)$ $D_{12}=(x_{max}-1, y_{min}+1)$ $D_{22}=(x_{max}-1, y_{min}+1)$ is stored as window inner frame information in the window management table as shown in FIG. 12 (process 82 in FIG. 10). Next, the information obtained at process 82 and a straight line display command is sent to the display controller 9 (process 83). Then, the display controller 9 causes the outer straight lines of the window frame as including $\overline{A_{11}B_{11}}$, $\overline{B_{21}D_{21}}$, $\overline{C_{11}D_{11}}$, and $\overline{C_{21}A_{21}}$ to be displayed (process 91 in FIG. 11), and succeedingly the inner straight lines of the window frame as including $\overline{A_{12}B_{12}}$, $\overline{B_{22}D_{22}}$, $\overline{D_{12}C_{12}}$, and $\overline{C_{22}A_{22}}$ (process 92 in FIG. 11). With the above processes of FIG. 11, a window shown in FIGS. 8A and 8B is displayed.

If a window frame is composed of one dot line, a window is displayed having its corner as shown in FIGS. 9B and 9C. In this case, since the window frame is not composed of outer and inner straight lines, only one straight line is considered for a frame line.

The example shown in FIG. 9B is a case where only one dot at the corner is not displayed, whereas the example shown in FIG. 9C is a case where three dots at the corner are not displayed.

Figure 13:
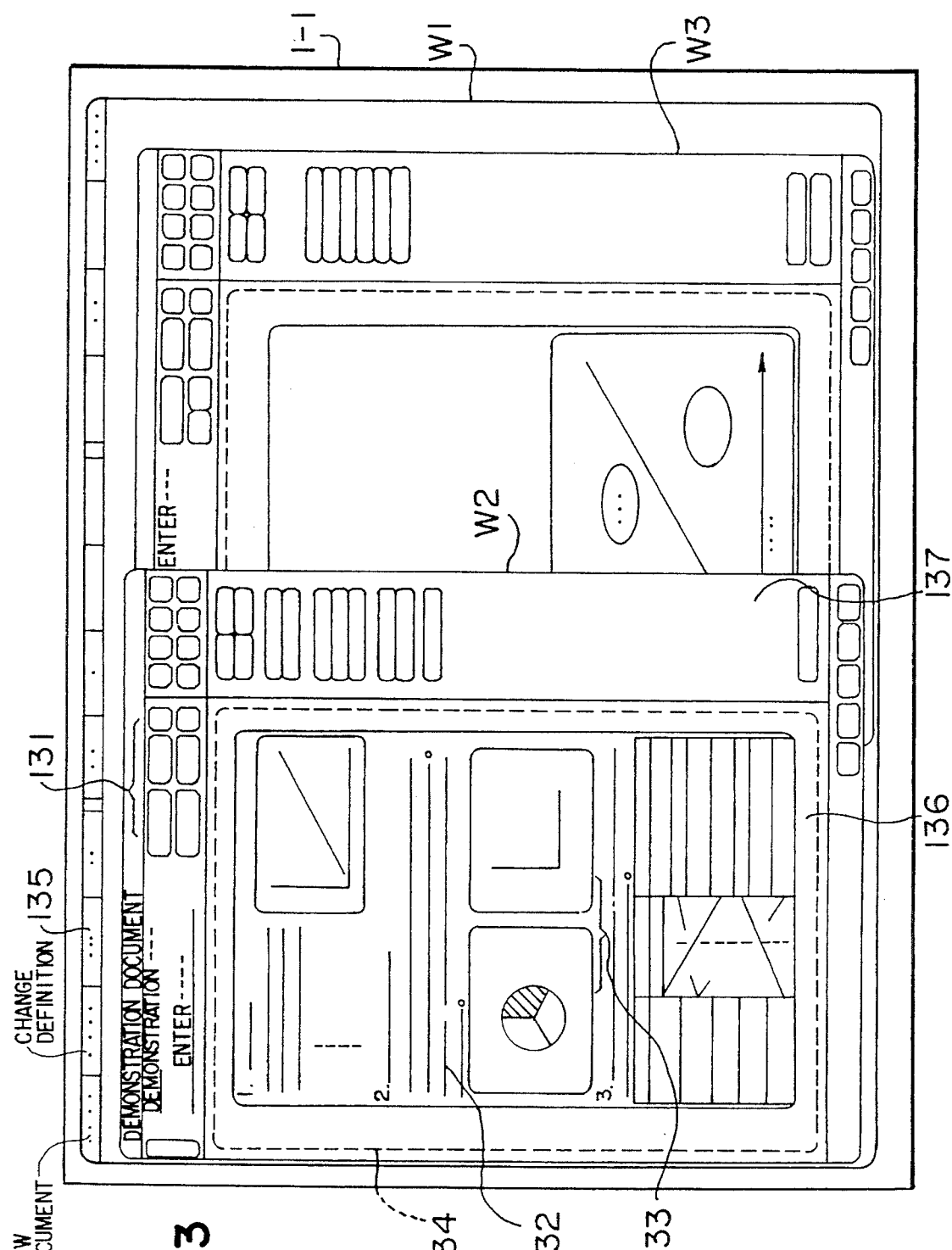
FIG. 13 shows a display example obtained by the document editing apparatus according to the present invention.

FIG. 13 shows an example of a display obtained by using the document editing apparatus (FIG. 2). On the display screen, there is displayed on the display screen a document editing system. For window W1, programs are running for making a new document and changing a definition. In window W2, an edited "demonstration document" is displayed, and in window W3 another edited document is displayed.

On the display screen, a rounding process is effected not only for the windows but also for rectangular area frames within the window. The "rectangular area frame" means a rectangular a frame surrounding a particular area on the display screen or graphs within a document, for purpose of clearly discriminating them from the others. Reference numeral 131 denotes a command menu used for editing a document, 132 a sentence area in the document, 133 a graph area in the document, 134 indicated with a broken line an effective print area for a printer, and 135 a command for window W1. Reference numeral 136 denotes a document editing area of window W2, and 137 a command input menu for window W1. The rounding process for the areas 132 to 134 and 136 is the same as that for the window described above. As seen from FIG. 13, four corners of each window frame and the corners of the respective rectangular areas are all rounded. Therefore, there is realized a visually soft display to which an operator needs not pay attention unnecessarily.

Rounding the corners of a window frame and rectangular area frame is performed only during displaying, so that a hard copy having not-rounded corners can be outputted. Specifically, all the corners (or desired corners) of the windows W1 to W3 and rectangular areas 132, 133, . . . can be outputted as not-rounded corners. This is accomplished by displaying a rectangular frame in accordance with the inputted coordinate data which have not been subjected to such a rounding process.

As described so far, four corners of each rectangular frame of a window or view port are automatically rounded and displayed by the display apparatus of this invention. Therefore, the quality of display on the display screen is improved, and an improved handy method for use by an operator is provided.

We claim:

1. A display apparatus having a multi-window function for displaying at least one window on a display screen, said display apparatus comprising:

preset means for presetting coordinate data defining a window having a rectangular outer frame composed of a plurality of straight sides, wherein each of said straight sides includes a set of pixels aligned in a straight line, each set of pixels aligned in a straight line includes a corner pixel at both ends of the straight line, and each corner pixel in each straight line represents a corner of said outer frame; and rounding means for performing a predetermined rounding processing for rounding each corner of said window such that all of the pixels except the corner pixels of said outer rectangular frame of said window are displayed on the display screen;

wherein each of the corner pixels of said rectangular outer frame represents a virtual intersection of a number of said sides of said rectangular frame, and said rounding means performs said rounding processing such that each of said virtual intersections is prevented from being displayed on the display screen; and wherein said preset means presets coordinate data defining a rectangular inner frame of said window, said rectangular inner frame is composed of a plurality of straight sides, each of said straight sides of said rectangular inner frame includes a set of pixels aligned in a straight line, each set of pixels aligned in a straight line included within the straight sides of said rectangular inner frame includes an inner corner pixel at both ends of the straight line, and each inner corner pixel in each straight line represents an inner corner of said rectangular inner frame, and said rounding means performs said rounding processing such that all of the pixels of said rectangular inner frame are displayed on the display screen within said rectangular outer frame and the number of pixels in each side of said rectangular outer frame is not greater than the number of pixels in a corresponding side of said rectangular inner frame.

2. A display apparatus for displaying at least one rectangular area on a display screen, said apparatus comprising:

preset means for presetting coordinate data defining a rectangular area having a rectangular outer frame composed of a plurality of straight sides;

rounding means for performing a rounding processing for rounding each corner of said rectangular area;

display means for displaying said rectangular area having rounded corners; and hard copy output means for outputting, after said rounding means has performed said rounding processing, a hard copy of said rectangular area in which said rectangular area is displayed without rounded corners in accordance with said rectangular area as it existed before said rounding processing means performed said rounding processing.

3. A display apparatus according to claim 2, wherein said rectangular area is a window.

4. A display apparatus according to claim 2, wherein said rectangular area is a document editing area.

* * * * *